United States Patent [19]
Sweere et al.

[11] Patent Number: 5,876,008
[45] Date of Patent: Mar. 2, 1999

[54] SUSPENSION SYSTEM FOR VIDEO MONITOR OR OTHER EQUIPMENT

[75] Inventors: Harry C. Sweere, Minneapolis; Donald M. Voeller, Eagan; Fredrick D. Wucherpfenning, Bloomington, all of Minn.

[73] Assignee: Ergotron, Inc., Eagan, Minn.

[21] Appl. No.: 372,948

[22] Filed: Jan. 17, 1995

[51] Int. Cl.$^6$ .................................................... A47H 1/10
[52] U.S. Cl. ................ 248/325; 248/284.1; 248/281.11; 248/919; 248/280.11
[58] Field of Search ........................... 248/284.1, 281.11, 248/292.14, 299.1, 324, 325, 919, 921, 664, 660, 631, 593, 280.11

[56] References Cited

U.S. PATENT DOCUMENTS

| | | | |
|---|---|---|---|
| 1,189,754 | 7/1916 | Trenaman | 248/281.11 |
| 3,721,416 | 3/1973 | Goudreu | 248/325 |
| 3,981,340 | 9/1976 | Anderson | 150/50 |
| 4,166,602 | 9/1979 | Nilsen | 248/281.11 |
| 4,453,687 | 6/1984 | Sweere | 248/183 |
| 4,953,822 | 9/1990 | Sharber | 248/281.11 |
| 5,014,693 | 5/1991 | Wright, II | 248/324 |
| 5,133,547 | 7/1992 | Pardi | 273/1.5 R |

*Primary Examiner*—Leslie A. Braun
*Assistant Examiner*—Gwendolyn W. Baxter
*Attorney, Agent, or Firm*—Hugh D. Jaeger

[57] ABSTRACT

A suspension system having a four bar linkage system including an angled arm for adjustable and positionable vertical and horizontal support of a video monitor or the like. A weight counterbalance adjustment mechanism adjustably compensates for various weights of a load held by the angled arm. Gas springs provide for vertical support of the angled arm. Configured slots in which the upper ends of the gas springs position provide for minimal manual positioning effort and a linear counterbalance throughout the entire range of vertical adjustment. An arm bent at an angle of 120° overcomes the traditional interference of the load with movement of the arm beyond 45°.

40 Claims, 12 Drawing Sheets

5,876,008

SUSPENSION SYSTEM FOR VIDEO MONITOR OR OTHER EQUIPMENT

CROSS REFERENCES TO CO-PENDING APPLICATIONS

None.

BACKGROUND OF THE INVENTION

1. Field of the Invention

The present invention is for a suspension system, and more particularly, pertains to a video monitor support system incorporating supporting gas springs in alignment with predetermined arced slots or tracks. A four bar linkage system is incorporated to maintain parallel geometry of the supported video monitor.

2. Description of the Prior Art

Prior art support systems have not provided for movement of a video monitor over a wide range of angles, such as between eyesight level for reading of a video monitor to above head level for storage of a video monitor.

In some applications or environments, such as in a hospital, it is important to have a wide range of movements for a video monitor. In the past, video monitors have been fixed in one position or secured to an arm with no or very limited movement.

The present invention provides a video monitor suspension system which suspends a monitor or monitor support caddy with a wide latitude of movement and overcomes the disadvantages of the prior art.

SUMMARY OF THE INVENTION

The general purpose of the present invention is to provide a suspension system for the support of a video monitor or other equipment.

According to one embodiment of the present invention, there is provided a suspension system for a video monitor or associated devices, including a vertically aligned swiveled major bracket, an angled support arm pivotally attached to the major bracket, a minor bracket pivotally attached to one end of the angled support arm, bar linkages between the major and minor brackets which maintain horizontal stability of the minor bracket so that a suspended load remains plumb, and a weight counterbalance assembly which includes a weight counterbalance adjuster mechanism secured to the underside of the angled support arm, arced slots in the weight counterbalance adjuster mechanism, and gas springs supporting the weight counterbalance adjuster mechanism, the angled support arm, and its suspended load, such as a video monitor.

One significant aspect and feature of the present invention is a suspension system which pivots about a vertical axis.

Another significant aspect and feature of the present invention is a suspension system having a vertical angular motion adjustment of 90°. The resulting moment on the support mechanism is varied between a short moment, a longer moment, and then a shorter moment as the angled support arm is positioned vertically.

Another significant aspect and feature of the present invention is that the vertical range of movement of the system is greater than the length of the angled arm. For example and illustration, an angled arm of 22" in length provides for a vertical movement of 30".

Yet another significant aspect and feature of the present invention is the use of a four bar linkage system to maintain vertical orientation of a bearing mount containing a tilt and swivel mount in which a monitor support bracket or caddy is secured and suspended.

Still another significant aspect and feature of the present invention is the use of a weight counterbalance adjuster mechanism having algorithm derived or computer analysis derived arced slots.

An additional significant aspect and feature of the present invention is the use of gas springs for support of an arm and its load.

A further significant aspect and feature of the present invention is the use of an arm down-lock to prevent arm runaway when a supported load such as a video monitor is removed from the end of the support arm.

Another significant aspect and feature of the present invention is the utilization of an automatically engaging up-lock and hidden release lever to provide for protection from catastrophic failure of the gas springs or from operation by unauthorized personnel.

Another significant aspect and feature of the present invention is the elimination of load interference through the use of an angled arm.

Having thus set forth significant aspects and features of the present invention, it is the principal object hereof to provide a lift system for the support of a video monitor or other equipment which includes an angled arm, a weight counterbalance adjuster mechanism, and gas springs.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
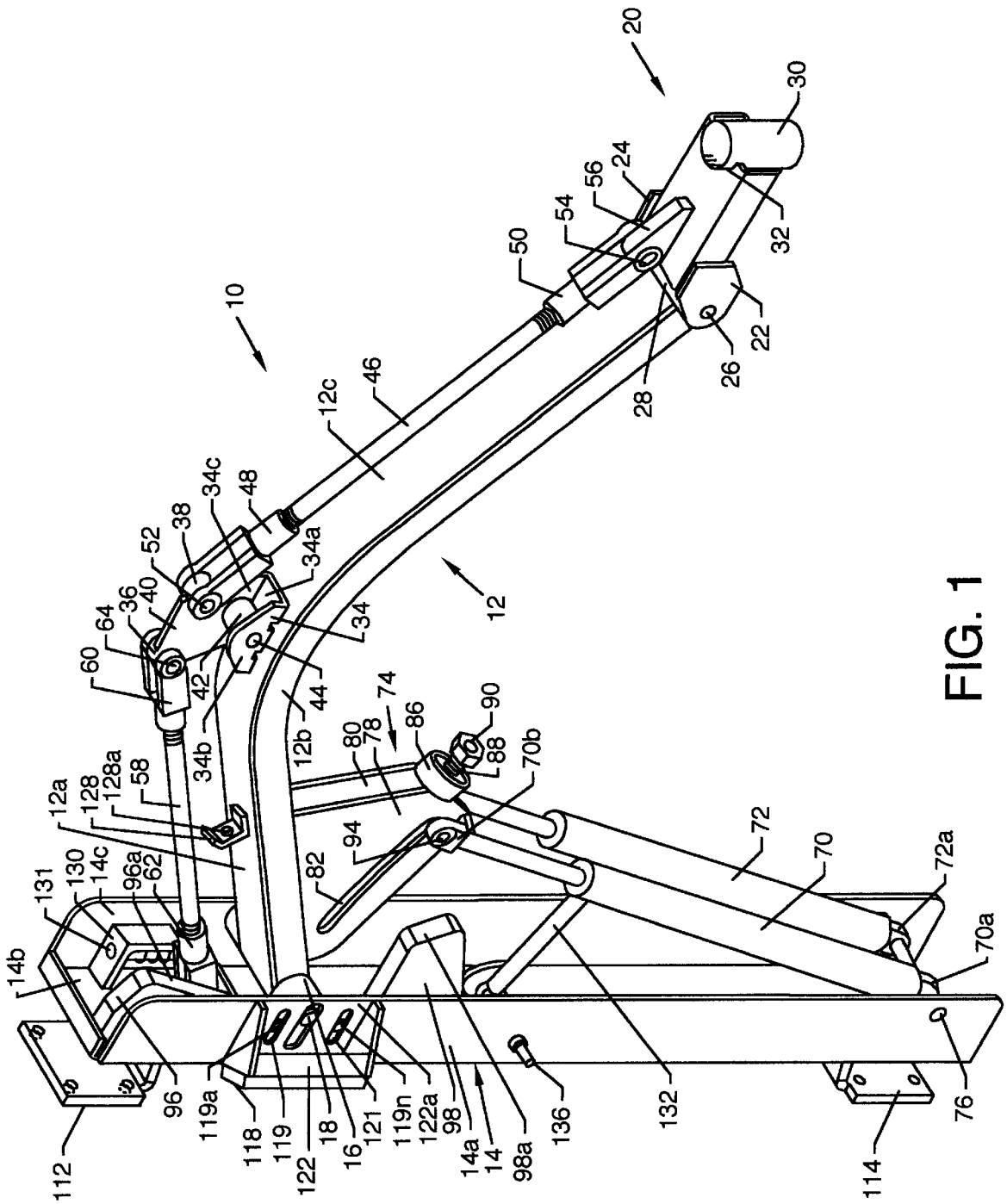
FIG. 1 is an isometric view of a suspension system according to the present invention.

FIG. 1 is an isometric view of a suspension system 10 of the present invention. A one-piece angled arm 12 constructed of rectangular tubing is pivotally secured at one end to a major bracket 14 of steel or aluminum channel. The vertically aligned major bracket 14 includes a planar back member 14b and opposing planar side members 14a and 14c extending perpendicularly from the common planar back member 14b. The one-piece angled arm 12 includes straight portions 12a and 12c aligned at angles to each other with an intermediate curved portion 12b located therebetween. The inboard end of the straight arm portion 12a aligns with and is secured such as by a weldment to a horizontally aligned pivot tube 16. A pivot pin 18 extends through the planar side members 14a and 14c to pivotally secure the angled arm 12 to the major bracket 14. A minor bracket 20 of rectangular tubing is pivotally secured to the outboard end of the straight arm portion 12c. Vertically aligned and opposing plates 22 and 24 are secured appropriately to the vertical sides of the minor bracket 20. A pivot tube 28 at the end of the straight arm portion 12c extends between the opposing plates 22 and 24. A pivot pin 26 extends horizontally through the opposing plates 22 and 24 and through the pivot tube 28 secured to the outboard end of the straight arm portion 12c. A vertically aligned cylindrical bearing mount 30 is secured, such as by welding, to a semi-circular cutout 32 in the outboard end portion of the minor bracket 20. The cylindrical bearing mount 30 supports a tilt and swivel mount 160 (illustrated in FIGS. 11 and 12) such as like that referenced in the assignee's U.S. Pat. No. 4,453,687.

Figure 8:
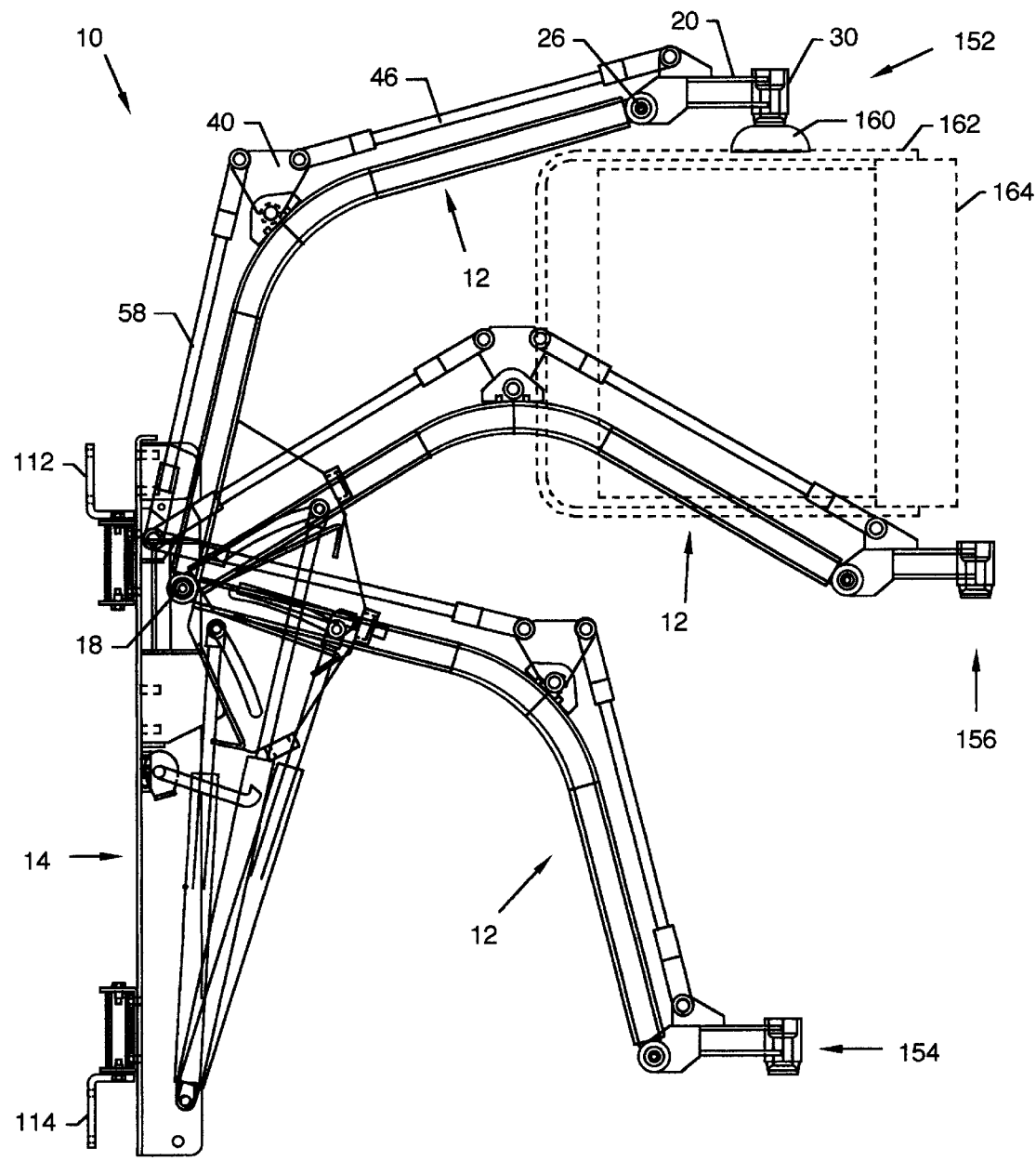
FIG. 8 is a left side view illustrating the range of vertical movement of the angled arm.

A four bar linkage system, which includes the straight portions 12a and 12c of the angled arm 12, functions to substantially maintain horizontal alignment of the minor bracket 20 and a video monitor bearing caddy which attaches to the bearing mount 30 by the referenced tilt and swivel mount. The angled arm 12 is adjustable throughout a range of vertical adjustment, as illustrated in FIG. 8, in which the minor bracket 20 and its load remain in plumb alignment. Various mounts, pivots, control rods, control links, and the like are secured to the angled arm 12, and major and minor brackets 14 and 20, as now described. Centrally located and secured to the angled arm 12 at the upper surface of the curved portion 12b is a control link bracket 34 having a planar bottom 34a and planar sides 34b and 34c extending perpendicularly from the planar bottom 34a. Spacer tubes 36 and 38 are secured to the upper apexes of a planar and triangular center link 40, and a spacer tube 42 is secured to the lower apex of the center link 40. Pivot pin 44 extends through the planar sides 34b and 34c of the control link bracket 34 to pivotally secure the center link 40 to the angled arm 12. An outboard control linkage rod 46 forming another bar of the four bar linkage system and having opposing linkage connectors 48 and 50 threadingly and adjustably attached is secured to the triangular center link 40 by a pivot pin 52 passing through the end members of the linkage connector 48 and spacer tube 38. The remaining end of the outboard control linkage rod 46 is secured by a pivot pin 54 passing through the end members of the linkage connector 50 and through a vertically aligned link attachment bracket 56 secured to the upper horizontal planar surface of the minor bracket 20. An inboard control linkage rod 58 forming the remaining bar of the four bar linkage system and having opposing linkage connectors 60 and 62 threadingly and adjustably attached is secured to the triangular center link 40 by a pivot pin 64 passing through the end members of the linkage connector 60 and spacer tube 36. The inboard end of the inboard control linkage rod 58 is secured by a pivot pin 66 passing through the end members of the linkage connector 62 and through an inner link mounting bracket 68 secured to the major bracket 14, as illustrated in FIG. 2.

Figure 2:
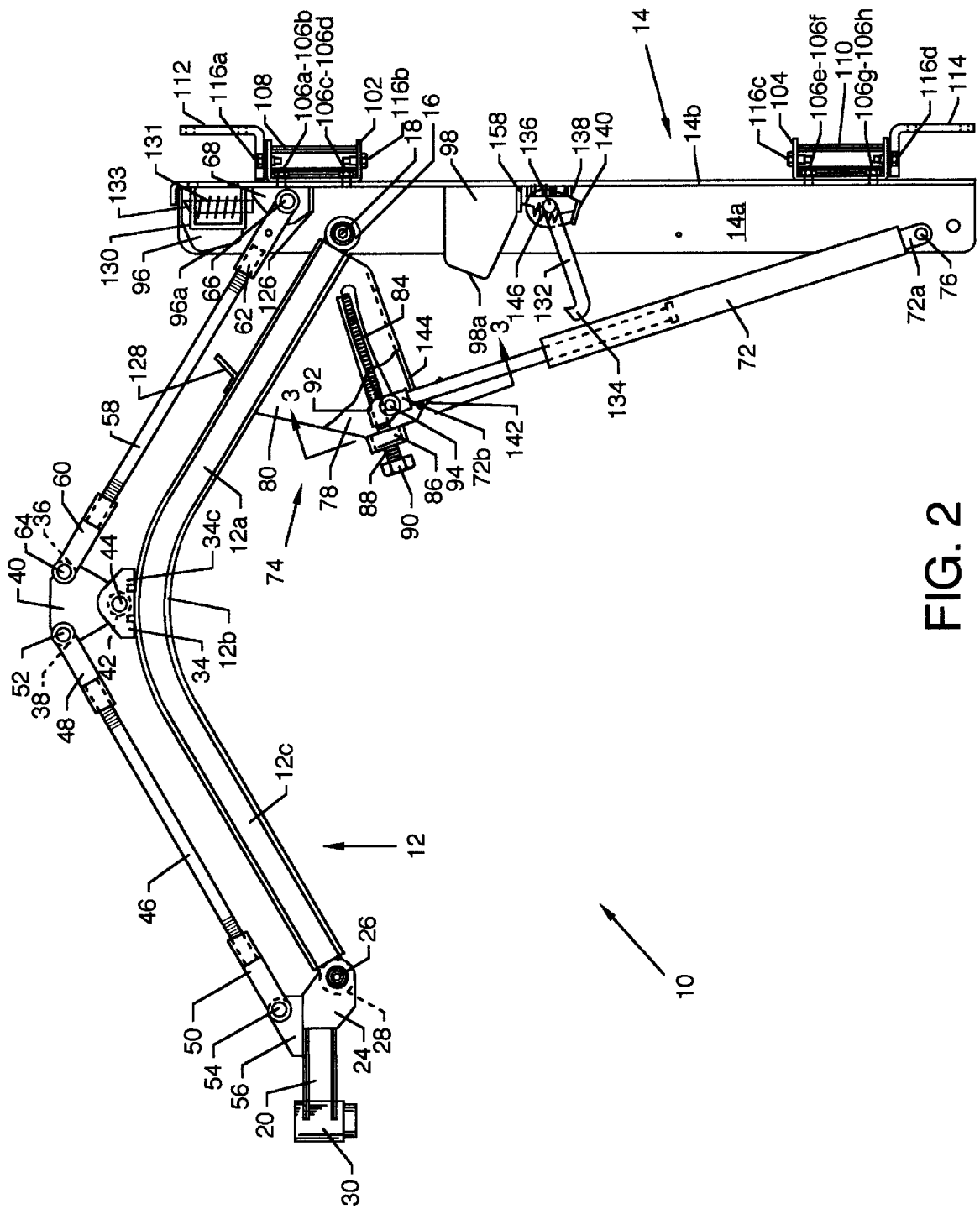
FIG. 2 is a right side view of the suspension system.
Figure 3:
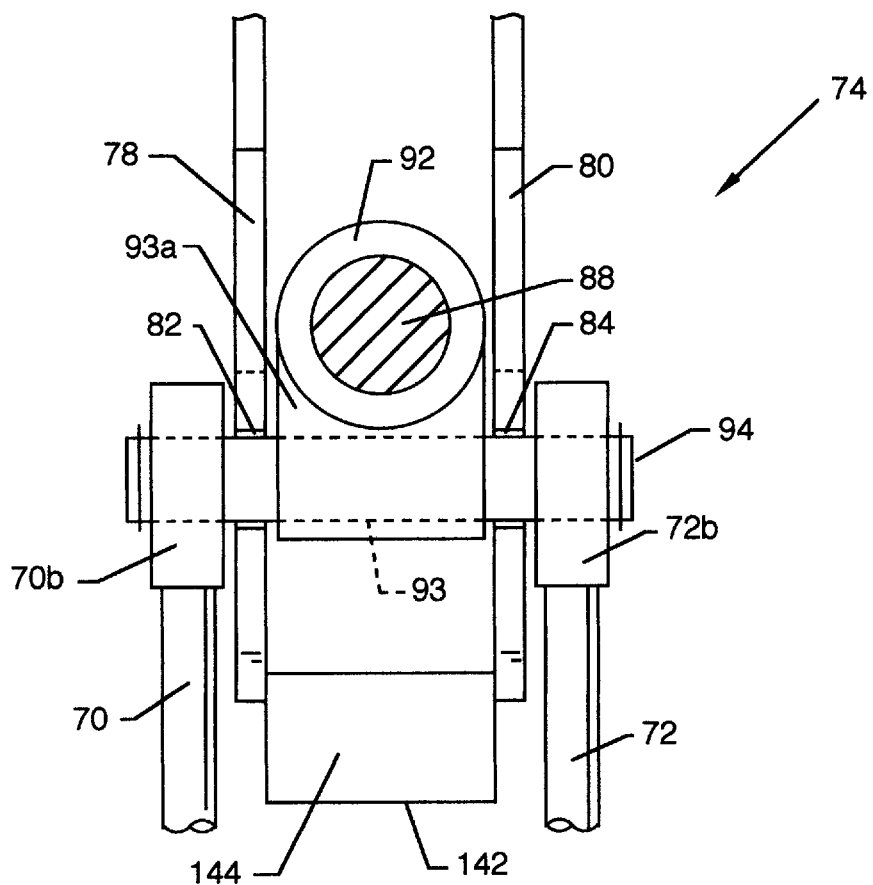
FIG. 3 is a partial cross sectional view of the weight counterbalance adjuster mechanism taken along line 3—3 of FIG. 2.

Vertical support and "counterbalancing" of the angled arm 12, its load, such as a video monitor, and associated component members is offered by a weight counterbalance assembly which includes parallel gas springs 70 and 72 having their stationary securement ends 70a and 72a pivotally secured by a pivot pin 76 to the lower portion of the major bracket 14 and their non-stationary or extendable securement ends 70b and 72b secured to a weight counterbalance adjuster mechanism 74 located and secured to the underside of the inboard straight portion 12a of the angled arm 12, as also partially illustrated in FIG. 2. The weight counterbalance adjuster mechanism 74 includes generally triangular-shaped, vertically aligned and parallel opposing plates 78 and 80 extending perpendicularly and downwardly from the underside of the straight inboard arm portion 12a. Plates 78 and 80 include opposing algorithm derived arced slots 82 and 84 having a specific radius, length of arc and placement to provide minimum force inputs with maximum stability, as later described in detail. A ball socket retainer 86 is aligned with and secured to the ends of the plates 78 and 80. A threaded adjustment rod 88 having an adjustment nut 90 is threadingly and adjustingly secured and aligned in the ball socket retainer 86, as also illustrated in FIG. 2, to adjust the securement ends 70b and 72b along the arced slots 82 and 84 of the weight counterbalance adjuster mechanism 74. As illustrated in FIG. 2, a configured nut 92 threadingly and adjustably engages the non-stationary securement ends 70b and 72b of the gas springs 70 and 72. A pivot pin 94 extends through gas spring securement ends 70b and 72b and through a bore 93 formed in a lug 93a on the configured nut 92, as illustrated in FIG. 3.

An upper stop 96 is secured to the back planar member 14b of the major bracket 14 to limit the upward vertical travel of the angled arm 12. Upward movement of the angled arm 12 is limited by impingement of the straight arm portion 12a against the flat surface 96a of the upper stop 96. An automatically engaged up-lock mechanism 129, illustrated in FIG. 7 and having a hidden and secure release, locks the angled arm 12 in the full upper storage position to prevent catastrophic movement of the angled arm such as by the gas spring pressure failure, and to prevent unauthorized arm lowering by persons other than a trained operator. An angled bracket 128 is secured to the upper surface of the straight arm portion 12a and includes a hole 128a. A bracket 130 having a spring loaded pin 131 having a beveled surface 133 at one end is secured to the upper and inner region of the major bracket 14. At or near the upper limit, the beveled spring-loaded pin 131 slidingly engages hole 128a in the angled bracket 128 to secure the angled arm 12 in the upper position. When the operator desires to lower the system, a lock release lever 141 is pulled to disengage the lock mechanism and provide for downward movement of the angled arm.

Figure 6:
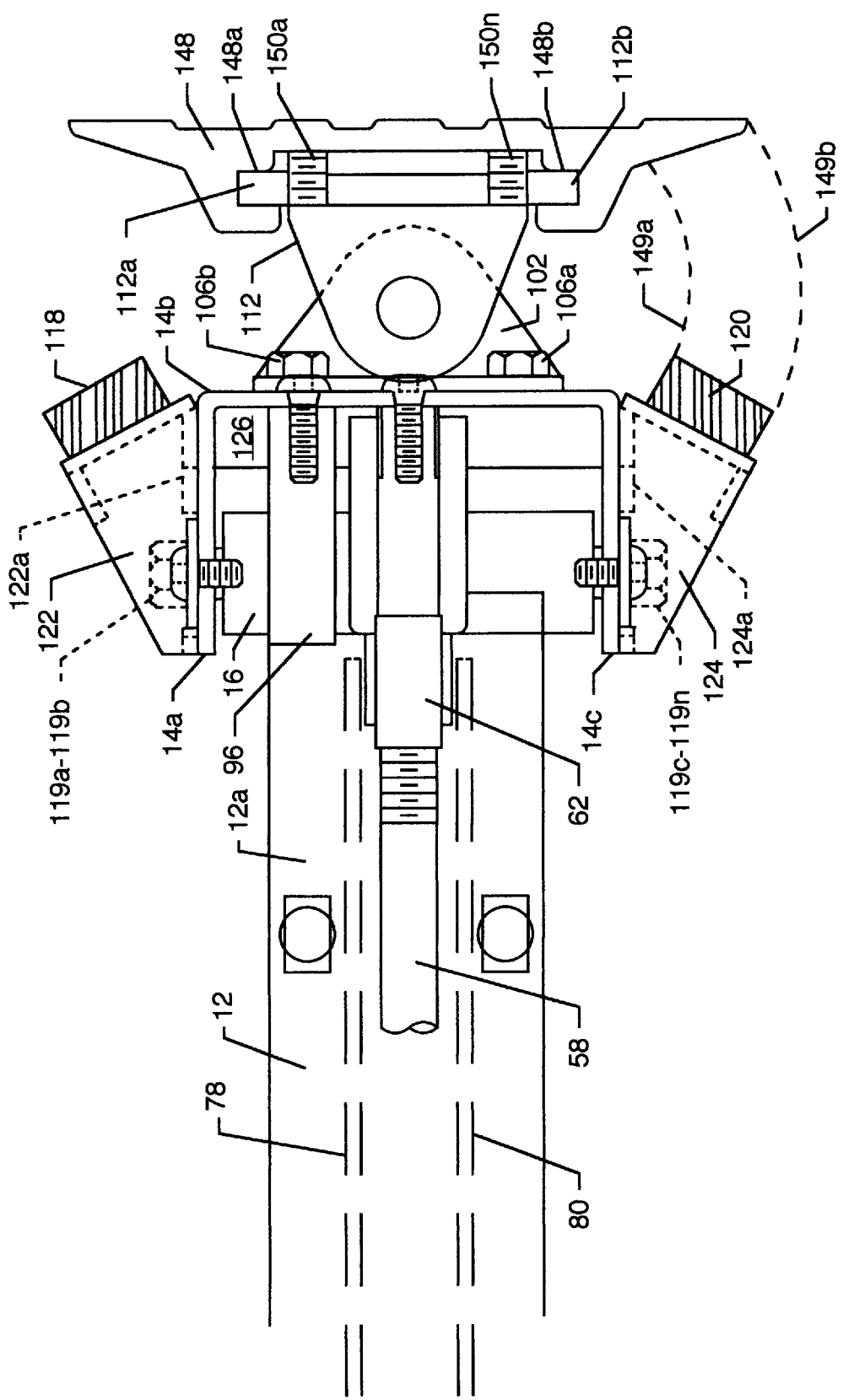
FIG. 6 is a top view of the major bracket pivotal attachment to a slotted mounting track.

A lower stop 98 is secured to the back planar member 14b of the major bracket 14 to limit downward vertical travel of the angled arm 12. Downward movement of the angled arm 12 is limited by impingement of the straight arm portion 12a against the flat surface 98a of the lower stop 98. As illustrated in FIG. 2, upper and lower rotation brackets 102 and 104 having spacer tubes 108 and 110 are secured by a plurality of machine screws 106a–106h and appropriate hardware to the rear of the major bracket 14 on the back planar member 14b. Wall mount brackets 112 and 114 are pivotally secured to the upper and lower rotation brackets 102 and 104 by machine screws 116a–116d. This pivoting arrangement allows the angled arm 12 and major bracket 14 and associated component members to swivel about a vertical axis up to as much as ±65° (130° total) of rotational arcuate travel as limited by rubber bumper pads 118 and 120 mounted on adjustable angled brackets 122 and 124 on side members 14a and 14c, respectively, as illustrated in FIG. 6. The rotational travel of the major bracket 14 and arm 12 is limited by impingement of the rubber bumpers 118 and 120 on the mounting wall or, if appropriate, a mounting track such as illustrated in FIG. 6. A plurality of machine screws 119a–119n or other suitable fasteners extend through like and similar slots 119 and 121 in each of the bracket support plates 122a and 124a of adjustable angled brackets 122 and 124 to adjust the rubber bumpers 118 and 120 inwardly or outwardly and thereby adjust the amount of arcuate travel of the major bracket 14, angled arm 12, and associated components, including a tilt and swivel mount from which a caddy carrying a video monitor is suspended.

FIG. 2 is a right side view of the suspension system 10 where all numerals correspond to those elements previously described. Horizontal stiffener members 126 and 127 are provided on planar members 14a, 14b and 14c in the region about the pivot tube 16 to lend extra support.

A down-lock latch 132 including a hook end 134 pivots on a positionable and rotatable shaft 136 journaled in an orifice in the planar side member 14a and in a spring latch bracket 138. A spring latch mounting bracket 140 is secured over and about the shaft 136 and serves as a rotatable platform for the down-lock latch 132. The hook end 134 captures the angled end 142 of a bracket 144 aligned and secured between the lower edges of plates 78 and 80. One end of a spring 146 is anchored to a stiffener 158 and the other spring end is secured to the spring latch mounting bracket 140 to maintain sufficient pressure to keep the hook end 134 engaged with the angled end 142 of the bracket 144 for unloading of a video monitor. Engagement of the down-lock latch 132 with the angled end 142 of bracket 144 maintains the angled arm 12 in a lowered secure position to preclude vertical runaway of an unweighted angled arm 12, such as when the supported equipment such as the video monitor is removed from the end of the angled arm 12. The down lock latch 132 is positioned by the operator and held in the proper position by spring 146 to selectively engage the angled end 142 of bracket 144 to lock the angled arm 12 in the downward position. The angled arm 12 may be unlocked by exerting a slight downward pressure on the angled arm 12 and rotating the rotatable shaft 136 to disengage the hook end 134 from the angled end 142 of the bracket 144.

The four bar linkage system functions to maintain the alignment of the minor bracket 20. Control linkage rods 46 and 58 represent the upper bars of the four bar linkage system. The portions of the angled arm 12 between pivot pin 26 and pivot pin 44 represent the outer and lower bar of the four bar linkage system and the portions of the angled arm 12 between pivot pin 44 and pivot pin 18 represent the inner and lower bar of the four bar linkage system.

FIG. 3 is a partial cross sectional view of the weight counterbalance adjuster mechanism taken along line 3—3 of FIG. 2 where all numerals correspond to those elements previously described. The pivot pin 94 extends through the securement ends 70b and 72b of the gas springs 70 and 72 and through a bore 93 formed in a lug 03a on the configured nut 92. Pivot pin 94 is also illustrated in alignment with opposing arced slots 82 and 84 along which the pivot pin 94 is adjusted by rotation of the threaded adjustment rod 88.

Figure 4:
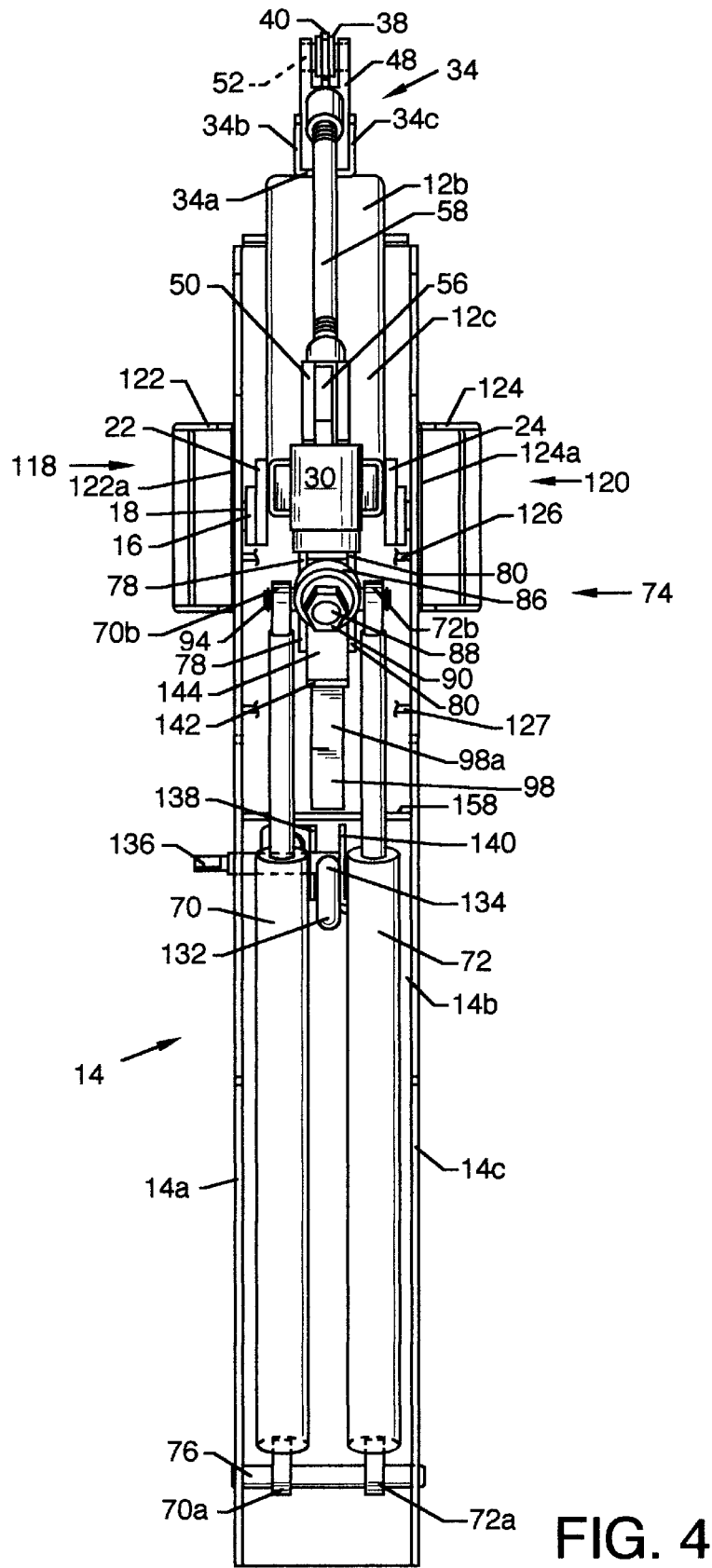
FIG. 4 is a front view of the suspension system.

FIG. 4 is a front view of the suspension system where all numerals correspond to those elements previously described.

Figure 5:
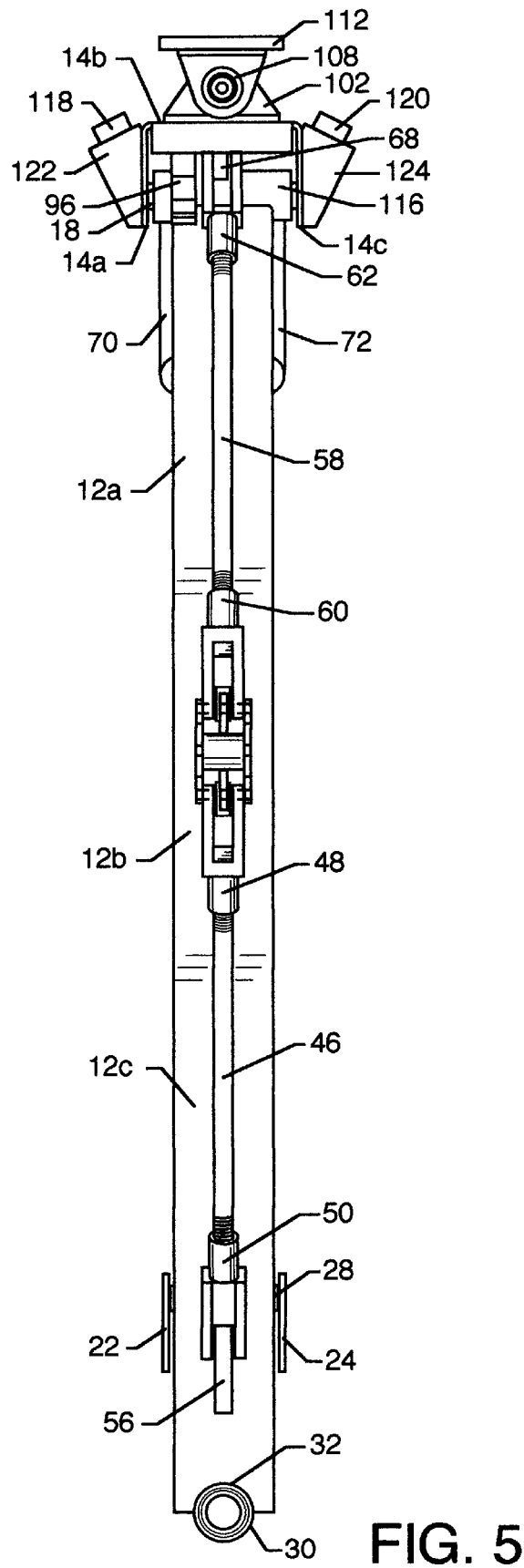
FIG. 5 is a top view of the suspension system.

FIG. 5 is a top view of the suspension system where all numerals correspond to those elements previously described.

FIG. 6 is a top view of the pivotal attachment of the major bracket 14 to a vertically oriented slotted mounting track 148 where all numerals correspond to those elements previously described. Planar end members 112a and 112b of the wall mount bracket 112 align in vertically oriented slots 148a and 148b respectively. A plurality of screws 150a–150n threadingly engage the vertical portion of the wall mount bracket 112 and are tightened to secure the wall mount bracket 112 within the slotted mounting track 148. As viewed from the top, the locus of the movement of the bumper 120 and angled arm 12 is represented by dashed lines 149a and 149b. Corresponding movement of bumper 118 allows rotation about the vertical axis of up to about 130° as determined by the inward or outward adjustment of the brackets 122 and 124.

Figure 7:
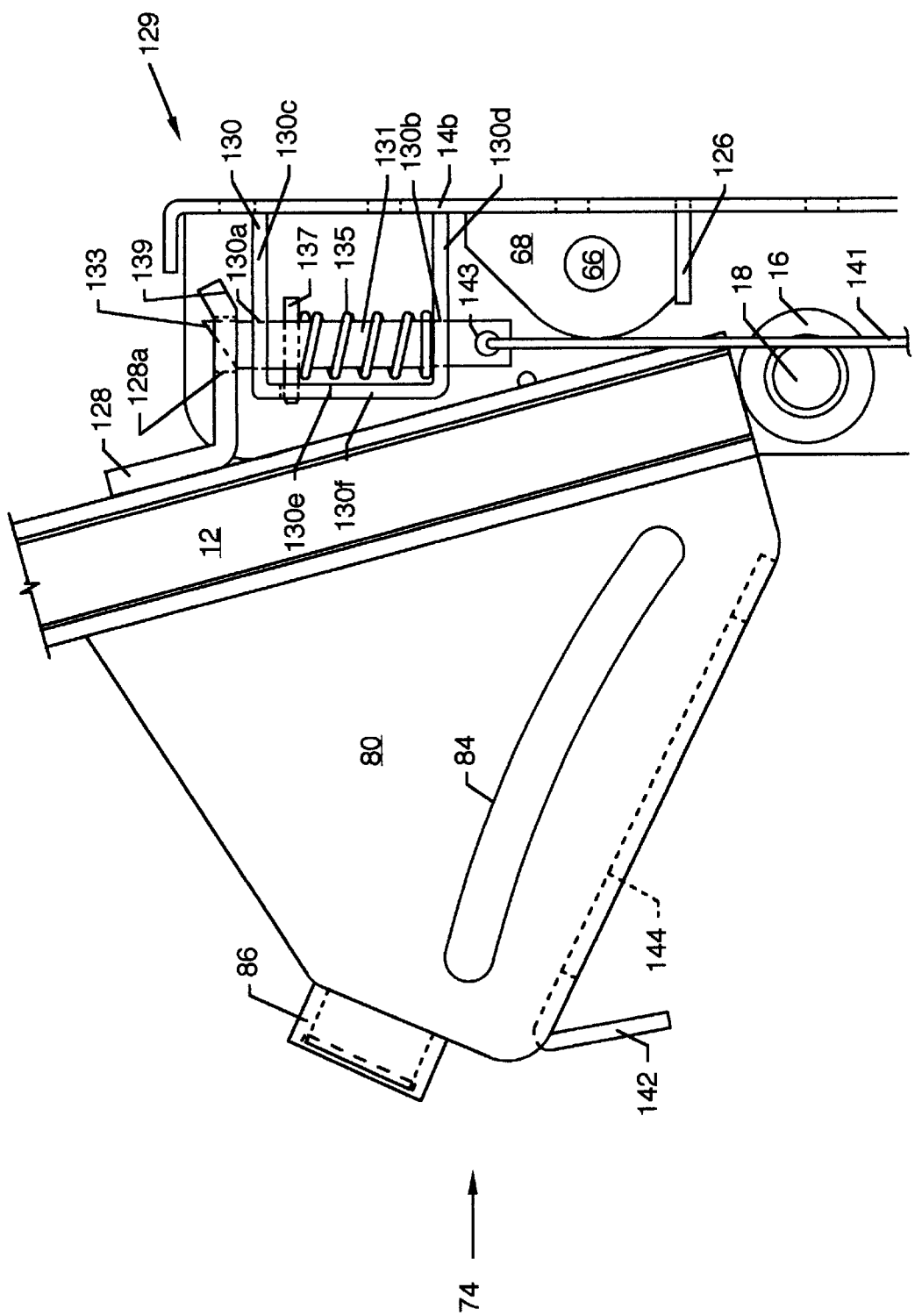
FIG. 7 is a side view in cutaway of the automatic up-lock mechanism.

FIG. 7 is a side view in cutaway of the automatic up-lock mechanism 129 engaging angled arm 12 in the full upward position where all numerals correspond to those elements previously described. Pin 131, having a beveled surface 133, aligns vertically in holes 130a and 130b of the horizontal members 130c and 130d of the bracket 130. A spring 135 aligns over and about the pin 131 between the horizontal member 130d and a stop pin 137 aligned horizontally through the pin 131. Stop pin 137 aligns also in a slot 130e in the vertically aligned bracket member 130f to limit vertical travel of the pin 131 and to orient the pin 131 in the bracket 130. The spring 135 forcibly positions the pin 131 upwardly, as illustrated, to engage hole 128a in the angled bracket 128 secured to the upwardly positioned surface of the angled arm 12. A ramped surface 139 on bracket 128 impinges against the beveled surface 133 of the pin 131 forcing the pin 131 downward to allow capture entry of the pin 131 through hole 128a in the bracket 128 to lock the angled arm 12 in the upward position as illustrated. A hole 143 accommodates an operator rod 141 extending to the lower or other region of the major bracket 14. Operator rod 141 allows for downward positioning of the pin 131 to release the up-lock mechanism 129 and can be located in a non-obvious area to preclude operation by unqualified personnel.

MODE OF OPERATION

FIG. 8 illustrates the range of vertical movement of the angled arm 12. Ranges vary from an upper and automatically locked position 152 to a lower and lockable position 154, and also a variety of intermediate positions illustrated as mid-position 156. A tilt and swivel mount 160, illustrated in FIGS. 11 and 12, and previously referenced, is secured and aligned in the bearing mount 30 for suspension of a caddy 162 and a monitor 164, shown in dashed lines.

Figure 9:
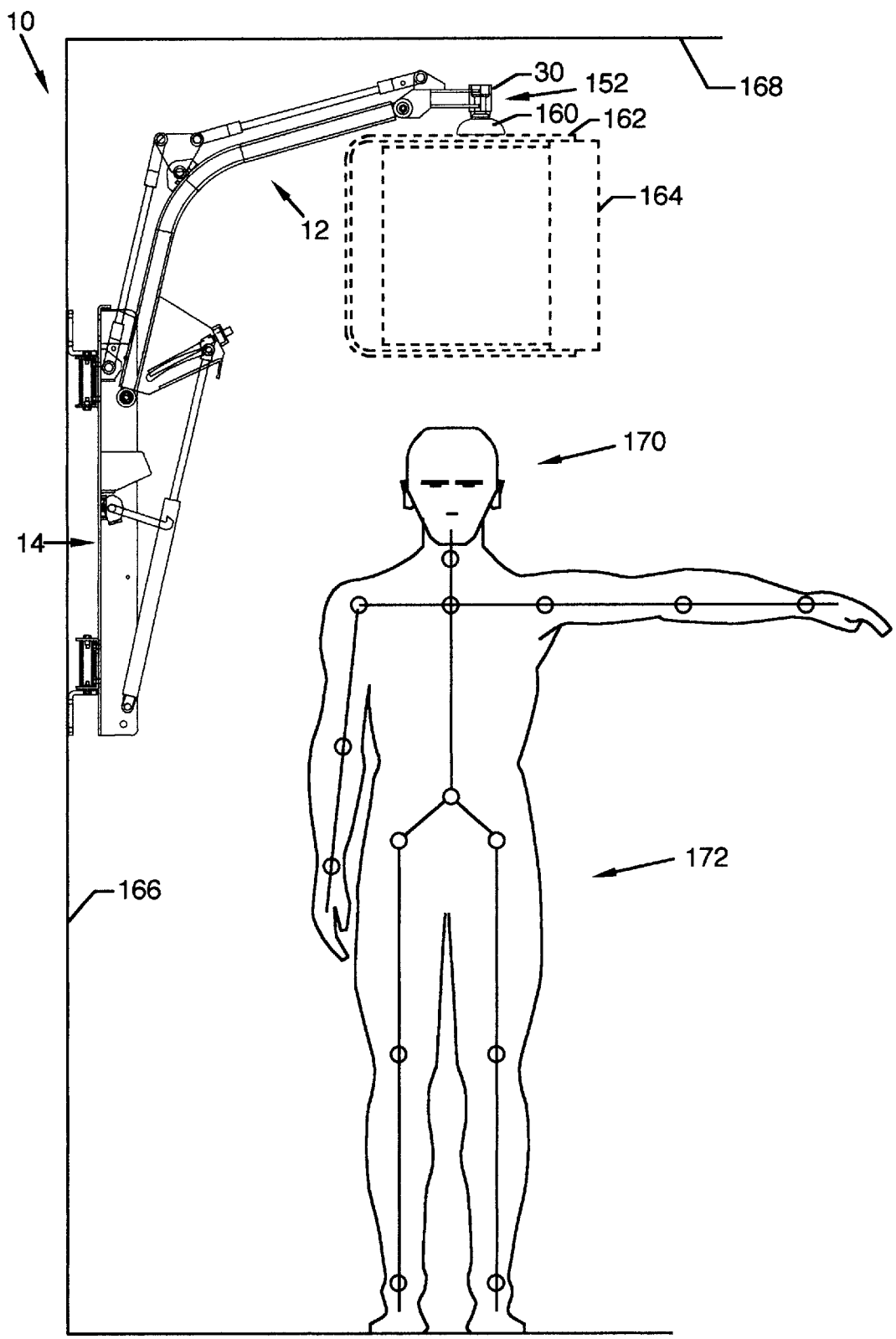
FIG. 9 is a side view of the suspension system secured to a wall in an upper locked position.

FIG. 9 illustrates a suspension system 10 secured to a wall 166 and positioned in the upper and locked position 152 in close proximity to a ceiling 168 where all numerals correspond to those elements previously described. A suspended caddy 162 and monitor 164 are positioned over and above the head 170 of a person 172, thus allowing sufficient clearance between the head 170 of the person 172 and the lower portion of the monitor 164 and caddy 162. The suspension geometry of the suspension system 10 allows for maximum vertical clearance between its load and the floor, whereas systems supporting the load from the bottom of the monitor or caddy include geometry beneath which interferes with vertical clearance space. The angled arm 12 also allows the monitor and caddy to be positioned higher than a system incorporating a straight arm, which would interfere with and limit the upward vertical placement of the monitor and caddy, especially when space is critical such as in congested hallways, aisles, etc. The angled arm 12 also limits protrusion of the system into the normal work area when the arm is fully down. The angled arm counterbalances the weight of the supported equipment for maximum stability with minimal positioning force.

Figure 10:
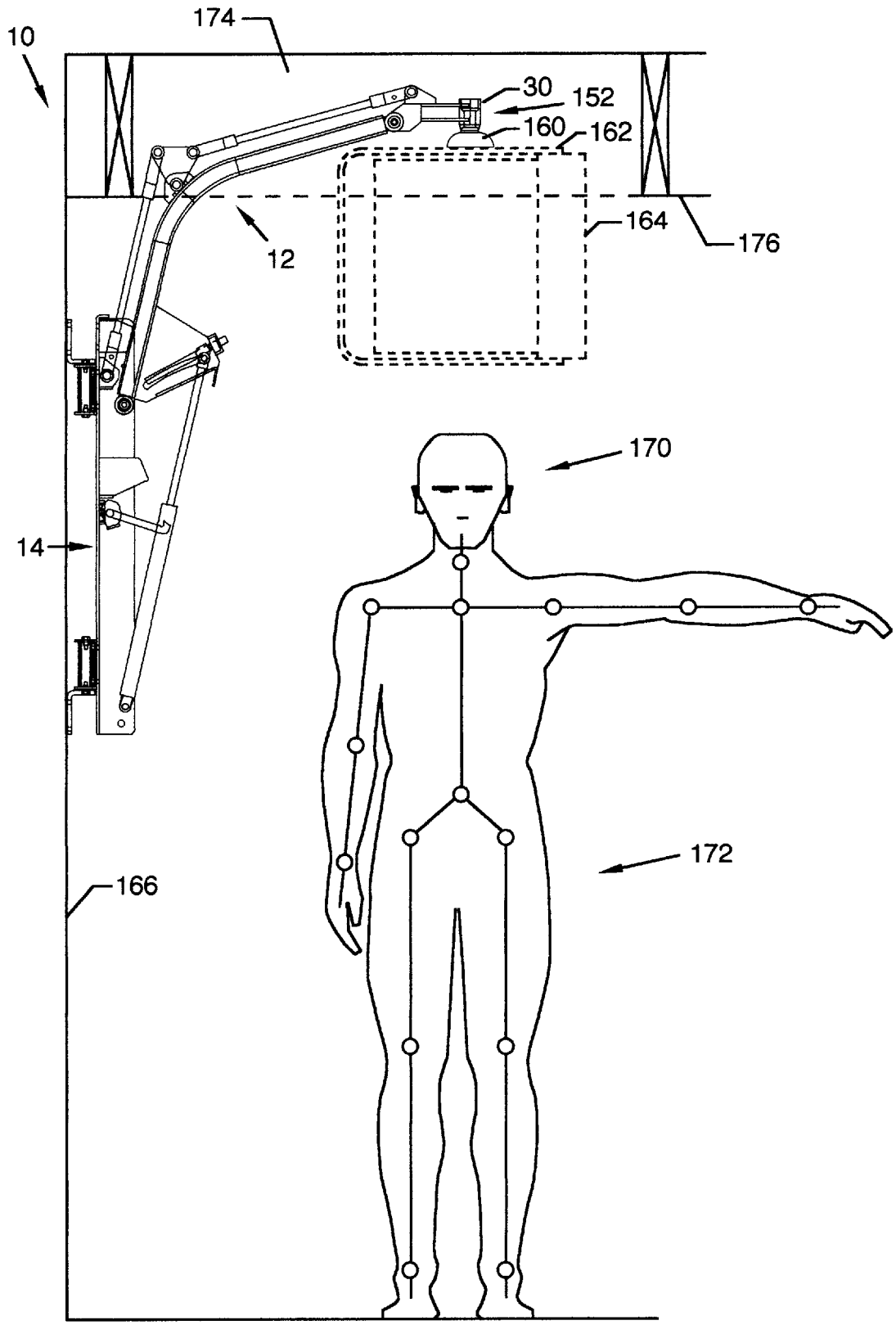
FIG. 10 is a side view of the suspension system in use with a ceiling well.

FIG. 10 illustrates the incorporation of the suspension system 10 with a ceiling well 174 where all numerals correspond to those elements previously described. The suspension system 10 can also be incorporated in conjunction with a low ceiling 176 by including a ceiling well 174 extending into and above the level of the low ceiling 176 to accommodate the geometry of the angled arm 12 and its load in the upper position 152.

Figure 11:
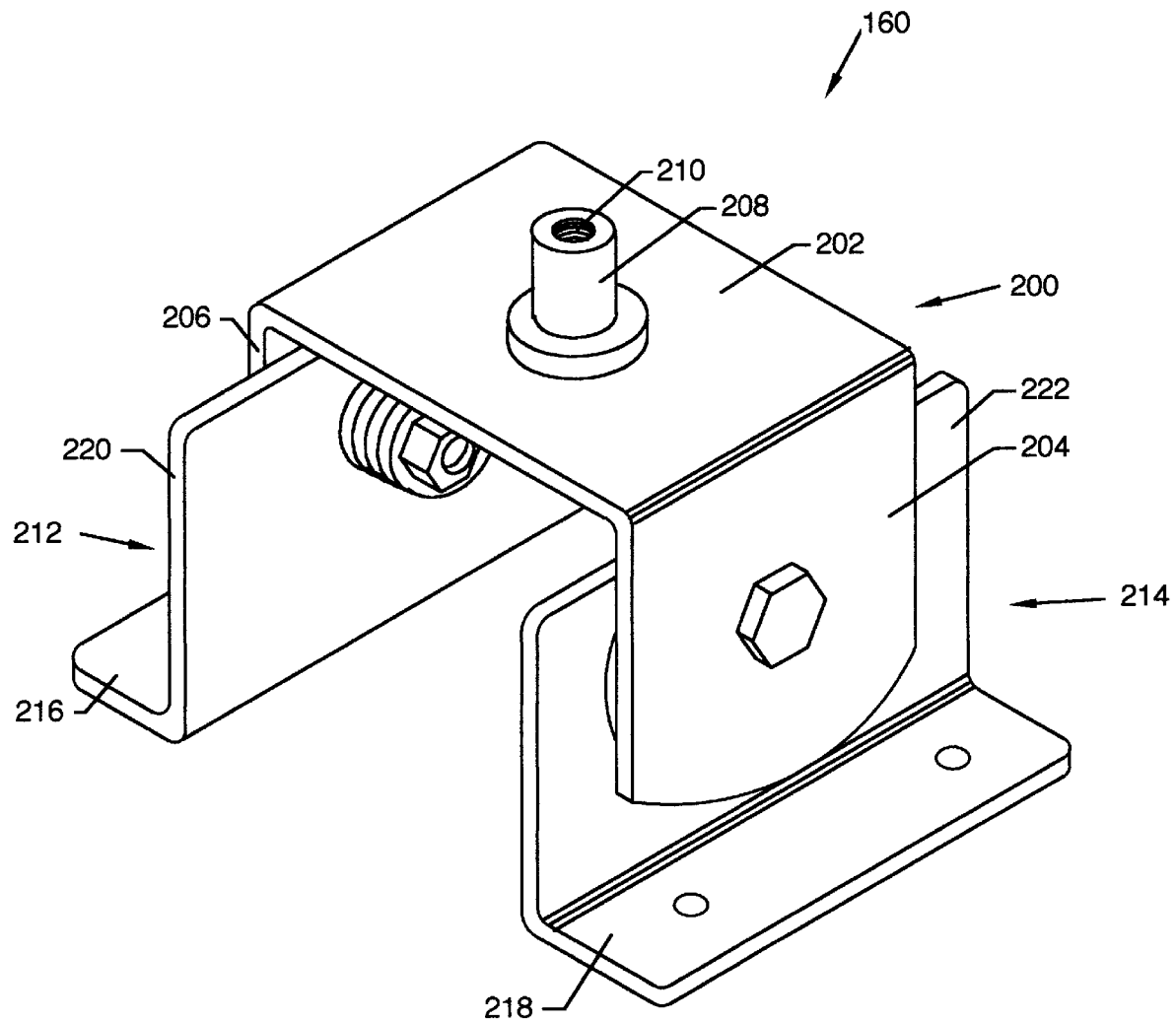
FIG. 11 is an isometric view of the tilt and swivel mount.

FIG. 11 is an isometric view of a tilt and swivel mount 160 with its cover removed, which secures to the bearing mount 30 on the minor bracket 20. The steel tilt and swivel mount 160 includes an inverted U-shaped channel member 200 having a top planar member 202, sides 204 and 206 extending at right angles from the top planar member 202, and a cylindrical attachment member 208 secured to the top planar member 202 having internal threads 210. A series of hardware including metal, plastic, or other composition material in the shape of washers, nuts and bolts rotatably secures the U-shaped channel member 200 to L-brackets 212 and 214. The L-brackets 212 and 214 include horizontal members 216 and 218 at right angles to vertical side members 220 and 222, respectively, providing an attachment means to the caddy 162.

Figure 12:
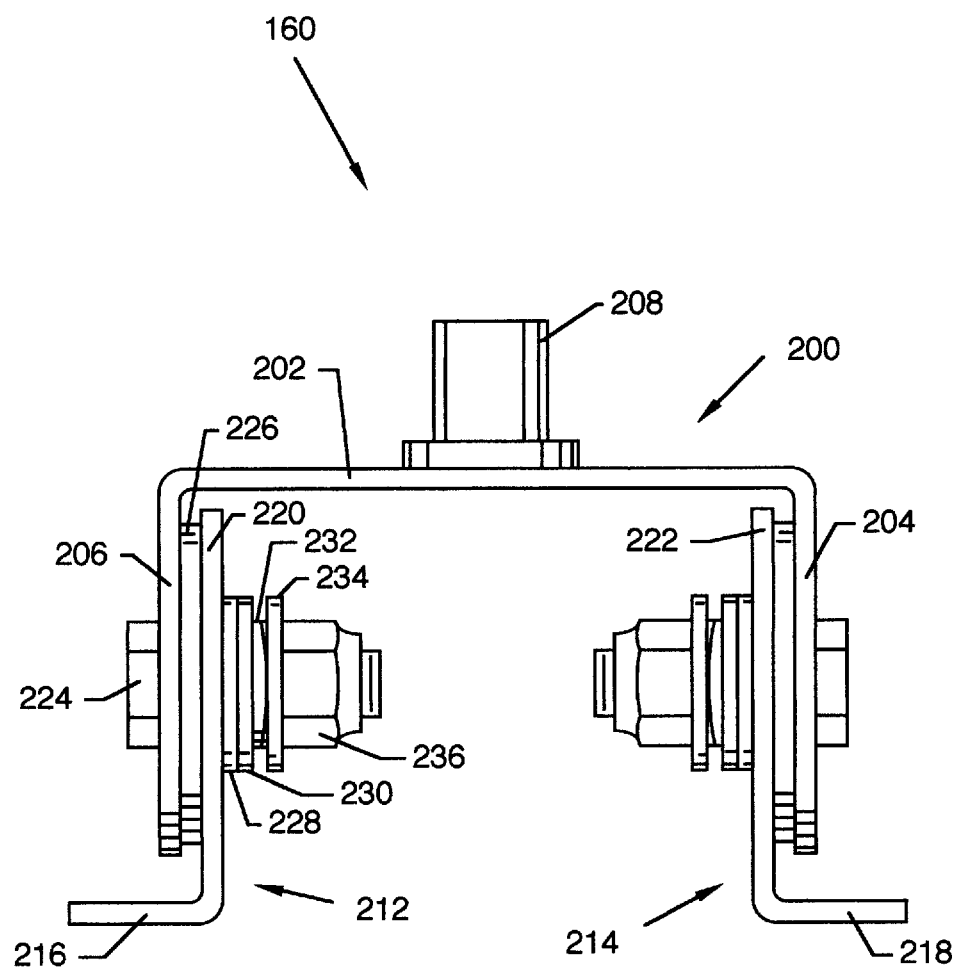
FIG. 12 is a front view of the tilt and swivel mount.

FIG. 12 is a front view of the tilt and swivel mount 160 where all numerals correspond to those elements previously described. A bolt 224 extends through side 206 of the U-shaped channel member 200, through a plastic washer 226 of ultra high molecular weight polyethylene (UHMWP) material disposed between side 206 and vertical side member 220 of the bracket 212, through vertical side member 220 of the bracket 212, through a bronze washer 228, through a steel washer 230, through a precision spring washer 232, through a steel washer 234, and through a castellated lock nut 236. Any suitable plastic material can be utilized having similar static and dynamic coefficients of friction. Such materials can include olefin plastics, and Tivars polymers. A mirror-like arrangement rotationally secures vertical side member 222 to the side 204 of the U-shaped channel member 200 in the same manner as just described. Appropriate tension is applied between the head of the bolt 224 and the nut 236 to allow manual rotational positioning of the U-shaped channel member 200 with respect to the L-brackets 212 and 214. Through selection of the appropriate precision spring washers 232 and use of a custom feeler gauge to establish precision spacing between the steel washers 230 and 234, a specific rotational friction setting can be established to provide appropriate tilt control for a broad range of video monitors.

The unique characteristics of the plastic material 226 allow smooth tilt adjustment of the tilt and swivel mount 160 and yet provide a constant frictional memory for the preset position of the video monitor. A horizontal poise is required of the operator to tilt the video monitor, at which time it remains in the new position.

Various modifications can be made to the present invention without departing from the apparent scope hereof.

We claim:
1. A suspension system used to support a video monitor or other equipment, comprising:
   a. a major bracket;
   b. a minor bracket;
   c. a four bar linkage system connecting said minor bracket to said major bracket, said four bar linkage system comprising:
      (1) an angled arm composed of a straight first bar joined to a straight second bar by a curved intermediate portion, said first bar being pivotally attached to said minor bracket and said second bar being pivotally attached to said major bracket;
      (2) a third bar located above said angled arm and having one end pivotally attached to said minor bracket and the other end pivotally attached to said angled arm at said curved intermediate portion; and
      (3) a fourth bar located above said angled arm and having one end pivotally attached to said major bracket and the other end pivotally attached to said angled arm at said curved intermediate portion; and,
   d. a weight counterbalance assembly that is disposed beneath said four bar linkage system, thereby to allow said four bar linkage system to be of a low height profile.

2. The suspension system of claim 1, wherein said weight counterbalance assembly is attached to said angled arm and includes a weight counterbalance adjuster mechanism which comprises opposing plates having opposing algorithm derived arced slots, a configured nut having a cross hole disposed about 90° to a threaded hole, a pivot pin accommodated in said cross hole and aligned in said arced slots in said opposing plates, a retainer attached to said plates, and a threaded adjustment rod extending through said retainer and through said threaded hole in said configured nut for the purpose of adjusting and positioning said pivot pin along said arced slots.

3. The suspension system of claim 2, wherein said weight counterbalance assembly further comprises: a pair of gas springs each having one end secured to said major bracket and another end secured to said pivot pin of said weight counterbalance adjuster mechanism.

4. The suspension system of claim 3, further comprising:
   a. a down-lock latch for securing said angled arm in a fully down position;
   b. an automatically engaging up-lock mechanism for securing said angled arm in its uppermost position; and,
   c. an up-lock release mechanism to allow lowering of said angled arm by trained/authorized personnel.

5. The suspension system of claim 3, wherein:
   a. said angled arm has vertical arcuate travel capability of 90°;
   b. said angled arm has a vertical adjustment range of about 30 inches; and,
   c. said major bracket has a horizontal swivel range of about 130°.

6. The suspension system of claim 1, wherein said major bracket is pivotable along a vertically aligned axis.

7. The suspension system of claim 1, wherein said minor bracket provides a consistent vertical alignment of an axis through which supported equipment can be rotated.

8. The suspension system of claim 1, wherein said weight counterbalance assembly allows said angled arm to counterbalance the supported equipment through a range of motion which is over 45° of rotation of said angled arm.

9. The suspension system of claim 1, including:
a. an upper stop to limit upward movement of said angled arm; and,
b. a lower stop to limit downward movement of said angled arm.

10. The suspension system of claim 1, including a downlock latch to prevent said angled arm from springing upward if the supported equipment is suddenly removed.

11. The suspension system of claim 1, including an up-lock mechanism to prevent said angled arm from dropping downward from its uppermost position.

12. The suspension system of claim 1, wherein said up-lock mechanism engages automatically each time said angled arm is moved to its uppermost position.

13. The suspension system of claim 1, wherein the system has a weight supporting capability of at least 100 pounds.

14. The suspension system of claim 1, wherein said weight counterbalance assembly is positioned with respect to said angled arm by computer analysis algorithm derived slots in opposing plates fastened to said angled arm.

15. The suspension system of claim 1, wherein said angled arm has a vertical arcuate travel capability of 90°.

16. The suspension system of claim 1, wherein said minor bracket has a total vertical travel capability of about 30 inches.

17. The suspension system of claim 1, wherein said major bracket has a horizontal swivel range of about 130°.

18. The suspension system of claim 1, wherein the system has a vertical range of movement at least as great as the length of said angled arm.

19. The suspension system of claim 1, including a tilt and swivel mount pivotally attached to said minor bracket.

20. A suspension system used to support a video monitor or other equipment and provide for easy adjustment of its vertical position, comprising:
a. a major bracket;
b. a minor bracket;
c. a four bar linkage system that is of a low height profile, thereby taking up a minimum of vertical space, comprising:
    (1) an angled arm with inner and outer straight portions joined by a curved portion and pivotally attached to said major bracket and said minor bracket;
    (2) an inboard control linkage rod pivotally connected to said major bracket and to a center link on said curved portion; and,
    (3) an outboard control linkage rod pivotally connected to said center link and said minor bracket; and,
d. a weight counterbalance assembly that is not contained within said four bar linkage system, thereby allowing said four bar linkage system to be of said low height profile, comprising:
    (1) at least one gas spring with one end of said gas spring pivotally connected to a configured nut and the opposite end pivotally connected to said major bracket;
    (2) a plate attached to said inner straight portion of said angled arm, said plate having a slot therein and said configured nut carrying a pivot pin which slidingly engages said slot; and,
    (3) a threaded adjustment rod that engages said configured nut and provides for positioning of said pivot pin carried by said configured nut along said slot in said plate.

21. A suspension system used to support a video monitor or other equipment and provide for easy adjustment of its vertical position, comprising:
a. a major bracket;
b. a minor bracket;
c. a four bar linkage system that is of a low height profile, thereby taking up a minimum of vertical space, comprising:
    (1) an angled arm with inner and outer straight portions joined by a curved portion and pivotally attached to said major bracket and said minor bracket;
    (2) an inboard control linkage rod pivotally connected to said major bracket and to a center link on said curved portion; and,
    (3) an outboard control linkage rod pivotally connected to said center link and said minor bracket; and,
d. a weight counterbalance assembly comprising:
    (1) at least one gas spring with one end of said gas spring pivotally connected to a configured nut and the opposite end pivotally connected to said major bracket;
    (2) a plate attached to said inner straight portion of said angled arm, said plate having an arced slot therein and said configured nut carrying a pivot pin which slidingly engages said arced slot in order to provide linear counterbalance force throughout the entire range of vertical adjustment; and,
    (3) a threaded adjustment rod that engages said configured nut and provides for positioning of said pivot pin carried by said configured nut along said arced slot in said plate.

22. A suspension system used to support a video monitor or other equipment and provide for easy adjustment of its vertical position, comprising:
a. a major bracket;
b. a minor bracket;
c. a four bar linkage system that is of a low height profile, thereby taking up a minimum of vertical space, comprising:
    (1) an angled arm with inner and outer straight portions joined by a curved portion and pivotally attached to said major bracket and said minor bracket;
    (2) an inboard control linkage rod pivotally connected to said major bracket and to a center link on said curved portion; and,
    (3) an outboard control linkage rod pivotally connected to said center link and said minor bracket; and,
d. a weight counterbalance assembly that is not contained within said four bar linkage system, thereby allowing said four bar linkage system to be of said low height profile, comprising:
    (1) at least one gas spring with one end of said gas spring pivotally connected to a configured nut and the opposite end pivotally connected to said major bracket;
    (2) a plate attached to said inner straight portion of said angled arm said plate having an arced slot therein and said configured nut carrying a pivot pin which slidingly engages said arced slot in order to provide linear counterbalance force throughout the entire range of vertical adjustment; and,
    (3) a threaded adjustment rod that engages said configured nut and provides for positioning of said pivot pin carried by said configured nut along said arced slot in said plate.

23. The suspension system of claim 20, 21 or 22, wherein said center link is pivotally attached to said curved portion of said angled arm.

24. The suspension system of claim 20, 21, or 22, including:

a. an upper stop to limit the upward movement of said angled arm; and, b. a lower stop to limit the downward movement of said angled arm.

25. The suspension system of claim 24, including a down-lock latch to prevent said angled arm from springing upward if the video monitor or other equipment is suddenly removed.

26. The suspension system of claim 25, wherein said down-lock latch is released through a rotational movement of the down-lock latch.

27. The suspension system of claim 24, including an up-lock mechanism to prevent said angled arm from dropping downward if said gas spring should lose force for any reason.

28. The suspension system of claim 27, wherein said up-lock mechanism engages automatically each time said angled arm is moved to its uppermost position.

29. The suspension system of claim 27, wherein said up-lock mechanism provides for contact of a beveled pin with a beveled surface.

30. The suspension system of claim 27, wherein said up-lock mechanism comprises a release mechanism.

31. The suspension system of claim 20, 21, or 22, wherein a tilt and swivel mount is pivotally attached to said minor bracket.

32. The suspension system of claim 31, wherein said tilt and swivel mount comprises a polymer washer compressed between two metal surfaces under compression provided by a spring washer.

33. The suspension system of claim 32, wherein said polymer washer is made of ultra high molecular weight polyethylene or other polymers having similar dynamic and static coefficients of friction.

34. The suspension system of claim 20, 21 or 22, wherein said angled arm provides for a vertical adjustment of at least 30 inches.

35. The suspension system of claim 20, 21 or 22, wherein said curved portion of said angled arm comprises a bend of approximately 120°.

36. The suspension system of claim 20, 21 or 22, wherein said slot is configured to form a radiused curve that provides minimal manual positioning effort for the entire range of vertical adjustment.

37. The suspension system of claim 20, 21 or 22, or wherein the adjustment of said threaded adjustment rod provides for adjustable support force by said gas spring throughout the range of positions of said angled arm and weights of up to 100 pounds.

38. The suspension system of claim 20, 21 or 22, wherein said angled arm has a vertical arcuate travel of 90°.

39. The suspension system of claim 20, 21 or 22, wherein said major bracket pivots about a vertical axis over a range of about 130°.

40. The suspension system of claim 20, 21 or 22, wherein said weight counterbalance assembly comprises two gas springs.

* * * * *